(12) United States Patent
Nonaka

(10) Patent No.: US 11,545,899 B2
(45) Date of Patent: Jan. 3, 2023

(54) SEMICONDUCTOR DEVICE, SYSTEM, AND CONTROL METHOD

(71) Applicant: RENESAS ELECTRONICS CORPORATION, Tokyo (JP)

(72) Inventor: Makoto Nonaka, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 323 days.

(21) Appl. No.: 16/860,862

(22) Filed: Apr. 28, 2020

(65) Prior Publication Data

US 2020/0403510 A1 Dec. 24, 2020

(30) Foreign Application Priority Data

Jun. 21, 2019 (JP) .............................. JP2019-115547

(51) Int. Cl.
*H02M 3/157* (2006.01)
*H02M 3/158* (2006.01)
*H02M 1/36* (2007.01)

(52) U.S. Cl.
CPC ............. *H02M 3/158* (2013.01); *H02M 1/36* (2013.01); *H02M 3/157* (2013.01)

(58) Field of Classification Search
CPC ..................... H02M 1/36; H02M 3/155–1588
See application file for complete search history.

(56) References Cited

U.S. PATENT DOCUMENTS

| 9,654,006 B2 | 5/2017 | Tajima |
| 10,027,219 B1 * | 7/2018 | Ye .......................... H02M 3/156 |
| 2005/0254265 A1 * | 11/2005 | Yamada ................ B60L 15/007 |
| | | 307/45 |
| 2015/0061391 A1 * | 3/2015 | Takata ...................... H02J 4/00 |
| | | 307/52 |

FOREIGN PATENT DOCUMENTS

JP 6445348 B2 12/2018

* cited by examiner

*Primary Examiner* — Peter M Novak
(74) *Attorney, Agent, or Firm* — McDermott Will & Emery LLP

(57) ABSTRACT

To provide a semiconductor device with a digital-controlled DC-DC converter capable of stable feedback operation while minimizing area, the semiconductor device includes a DC-DC converter whose characteristic is determined by the control parameter, a flash memory and a processor that controls the flash memory, both of which operate at a power supply based on the output of the DC-DC converter. The control parameter is stored in the flash memory, and the control parameter is read out from the flash memory and set in the DC-DC converter by the processor while the DC-DC converter is operating.

10 Claims, 12 Drawing Sheets

SEMICONDUCTOR DEVICE, SYSTEM, AND CONTROL METHOD

CROSS-REFERENCE TO RELATED APPLICATIONS

The disclosure of Japanese Patent Application No. 2019-115547 filed on Jun. 21, 2019 including the specification, drawings and abstract is incorporated herein by reference in its entirety.

BACKGROUND

The present invention relates to a semiconductor device, a system and a control method, for example, a semiconductor device with a non-volatile storage device and a DC-voltage converter (hereinafter referred to as a DC-DC converter or simply a converter), a system and a control method including the same semiconductor device.

As a DC-DC converter, there are analog control and digital control systems. A typical DC-DC converter of analog control method and of the digital control method includes configurations as shown in FIG. 11, for example. FIG. 11A shows the configuration of an analog-controlled DC-DC converter, FIG. 11B shows the configuration of a digital-controlled DC-DC converter.

In the analog-controlled DC-DC converter, the transistor MP1, MN1 are switched by a gate driver to generate an output voltage Vout by switching the current flowing through the inductor (coil) Lout and the capacitor Cout. The output voltage Vout generated is compensated, such as phase by a compensation circuit including a resistor and a capacitor, and is compared with the reference voltage by the comparator CMP1. By comparison, a difference between the output voltage Vout and the reference voltage, or an error, is provided from the comparator CMP1 to the Pulse Width Modulation (PWM) generation circuit.

In the PWM generation circuit, a comparator CMP2 compares the periodic saw wave with the error, and a pulse-width PWM signal corresponding to the error is generated and supplied to the gate driver. Since the pulse width of the PWM signal varies according to the magnitude of the error, the duty that is the ratio of the high-level period (or low-level period) to one period, changes in accordance with the error. Thus, for example, a period in which the transistor MP1 is turned on, will change in accordance with the error, in the DC-DC converter, and feedback operation is performed so as to reduce the error, i.e., the output voltage Vout of the voltage value corresponding to the reference voltage is generated.

A digital-controlled DC-DC converter has a configuration in which a compensation circuit and the PWM generation circuit provided by an analog-controlled DC-DC converter are realized by a digital circuit. In FIG. 11B, the compensation circuit is configured by the Proportional-Integral-Differential (PID) control circuit, the PWM generation circuit is configured by a comparator CMP2 that compares the saw wave from the counter and the output of the PID control circuit. Because of a digital control, the output from the comparator CMP1 is converted into a digital signal by the analog and digital conversion circuit (hereinafter, referred to as the ADC circuit), and supplied to the PID control circuit. In the digital-controlled DC-DC converter shown in FIG. 11B, for example, when the power is turned on, the soft start control circuit operates, the gate driver operates on the basis of the signals from the soft start control circuit.

Techniques for the digital-controlled DC-DC converter with a PID control circuit are described, for example, in Japanese Patent No. 6,445,348 (Patent Document 1).

SUMMARY

To stabilize the feedback operation in the DC-DC converter, the compensation circuit is configured to provide a characteristic corresponding to the switching frequency of the transistor MP1, MN1 or the like, the value of the inductor Lout, i.e., inductance, and the value of capacitor Cout, i.e., capacitance, shown in FIG. 11.

In the analog-controlled DC-DC converter, since the switching frequency of the transistor, the values of the inductor Lout and the capacitor Cout are preset, the resistor and the capacitor constituting the compensation circuit is predetermined and fixed so that the compensation circuit includes a characteristic suitable for these preset frequencies and values.

In contrast, in the digital-controlled DC-DC converter, by changing the control parameters supplied to the PID control circuit, it is possible to change the transfer function of the PID control circuit. This means that switching frequencies, a value of an inductor Lout and a value of a capacitor Cout can be arbitrarily selected. That is, even if the switching frequency, the values of the inductor Lout and the capacitor Cout are set to any frequency and values, it is possible to stabilize the feedback operation by changing the control parameters.

This digital-control scheme allows users to optimize switching frequencies, the values of the inductor Lout and the capacitor Cout depending on the desired DC-DC converter. For example, when the switching frequency, the values of inductor Lout and the capacitor Cout are selected in order to reduce the mounting component costs, it is possible to stabilize the feedback operation by selecting a control parameter corresponding to the selected switching frequency and the values of inductor Lout and the capacitor Cout. Further, for example, when the switching frequency is increased, the requirements of Electromagnetic Interference (EMI) becomes severe. However, it is also possible to improve the Electromagnetic Compatibility (EMC) tolerance by selecting a control parameter such that the feedback operation is stable even at a low switching frequency.

As a control parameter supplied to the PID control circuit, as shown in FIG. 11B, there are the proportional constant KP relating to the proportionality, the differential constant KD relating to the derivative, the offset constant OFFSET relating to the voltage offset and the integral constant KI relating to the integral.

The present inventor has studied a system with a DC-DC converter capable of changing the control parameters in response to changes in the switching frequency, the values of the inductor Lout and the capacitor Cout. FIG. 10 is a circuit diagram showing a schematic configuration of a system examined by the present inventor prior to the present invention. System 1 includes transistors MP1, MN1, an inductor Lout, a capacitor Cout, DC-DC converter 2 and a controller 3. DC-DC converter 2 includes comparators CMP1, CMP2, an ADC circuit, a PID control circuit, a counter and a gate driver or the like shown in FIG. 11B. Further, although omitted in FIG. 10, the output voltage Vout is supplied to the controller 3.

The controller 3 provides a non-volatile storage device 5 and a control circuit 4. A plurality of control parameters corresponding to each values of the switching frequency, the inductor Lout, and the capacitor Cout are stored in advance in the storage device 5. The control circuit 4 accesses the storage device 5 to read the control parameters corresponding to the set switching frequency, the values of the inductor Lout and the capacitor Cout, and then sets the read control parameters to DC-DC converter 2. Thus, the characteristic of the PID control circuit in DC-DC converter 2 becomes suitable for the switching frequency, the values of the inductor Lout and the capacitor Cout set by the user, so that stable feedback operation is performed.

However, since the controller 3 is required, there is a problem that the mounting area increases when the system 1 is realized. Further, the present inventor has considered that the controller 3 is operated by the output voltage Vout generated by DC-DC converter 2. However, in order to operate the controller 3, DC-DC converter 2 is required to generate the output voltage Vout. On the other hand, DC-DC converter 2 remains inoperable until the control parameter are supplied to DC-DC converter 2. Therefore, the operation voltage is not fed to the controller 3, and a problem of falling into a deadlock state that the inoperable state continues occurs.

Patent Document 1 describes a technique relating to a digital-controlled DC-DC converter, but does not describe or recognize the above-mentioned problems.

Other objects and novel features will become apparent from the description of this specification and the accompanying drawings.

A semiconductor device according to one embodiment is as follows.

That is, the semiconductor device includes a converter whose characteristics are determined according to the control parameter, a non-volatile storage device and a processor which operate with the converter's output voltage as an operating power supply. The control parameter is stored in the non-volatile storage device, and during periods when the output voltages are being output from the converter, the control parameter is read from the non-volatile storage device and set in the converter by the processor.

According to one embodiment, a semiconductor device with digital-controlled converters capable of stable feedback operation can be provided while suppressing increased mounting area.

DETAILED DESCRIPTION

Figure 1:
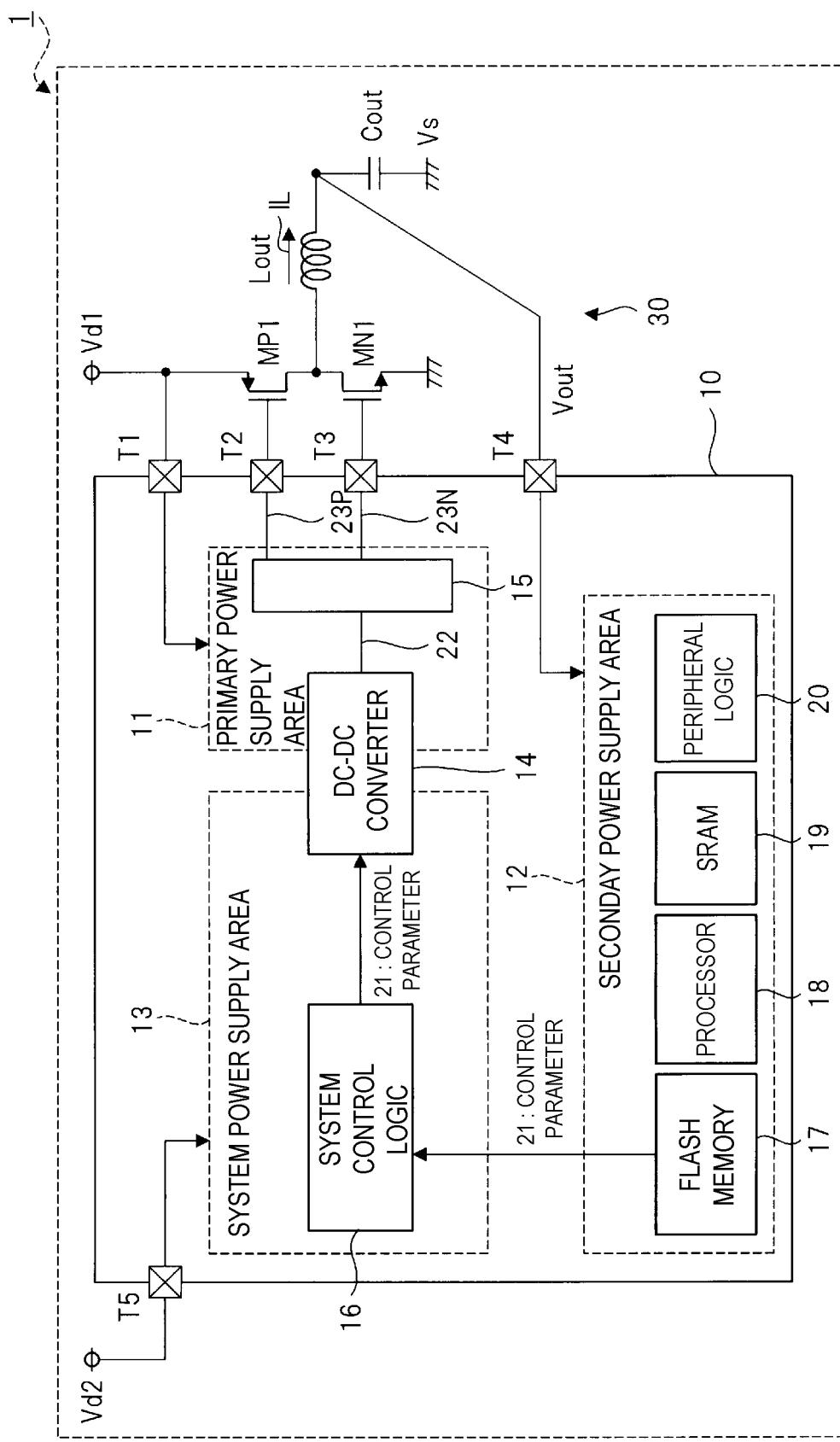
FIG. 1 is a circuit diagram showing a configuration of a system according to a first embodiment.

Embodiments of the present invention will be described below with reference to the drawings. It is to be noted that the disclosure is merely an example, and those skilled in the art can easily conceive of appropriate changes while maintaining the gist of the invention, which are naturally included in the scope of the invention. In addition, although the drawings may schematically represent the width, thickness, shape, and the like of each portion as compared with actual embodiments for the sake of clarity of description, the drawings are merely an example and do not limit the interpretation of the present invention.

In this specification and each drawing, the same reference numerals are assigned to the same elements as those described above with reference to the preceding drawings, and detailed description thereof may be omitted as appropriate.

FIG. 1 is a circuit diagram showing a configuration of a system according to a first embodiment. In FIG. 1, 1 denotes a system. Although the system 1 includes a plurality of semiconductor device, a plurality of transistors and a plurality of passive elements (inductors, resistors, capacitors, etc.), and the like, only what is needed for illustration is shown in FIG. 1.

In the figure, 10 shows semiconductor device. Without particular limitation, semiconductor device 10 is a microcontroller in which a plurality of circuit blocks are formed in one semiconductor chip. T1 to T5 show the external terminals provided on semiconductor device 10. External terminals T1, T4 and T5 are power supply terminals. The first power supply voltage Vd1 is powered to the external terminal T1, the second power supply voltage Vd2 is powered to the external terminal T5. Further, the external terminal T4, the output voltage Vout generated by DC-DC converter to be described later is fed.

The semiconductor device 10 includes a primary power supply area 11 to which the first power supply voltage is supplied as an operating voltage, the secondary power supply area 12 to which the output voltage Vout is supplied as an operating voltage and the system power supply area 13 to which the second power supply voltage Vd2 is supplied as an operating voltage. Each of the circuit blocks provided by semiconductor device 10 operates by an operating voltage that is disposed over any one or more areas of the primary power supply area 11, the secondary power supply area 12 and the system power supply area 13 and is supplied the operating voltage of the disposed area.

In FIG. 1, a circuit block of a portion of a plurality of circuit blocks provided by semiconductor device 10 is exemplified. That is, as a circuit block disposed in the secondary power supply area 12, there are exemplified a processor 18, a static memory (SRAM) 19 as a volatile memory device, a flash memory 17 as a non-volatile memory device, and a peripheral logic 20, and these circuit blocks operate by the output voltage Vout. Further, as a circuit block disposed in the system power supply area 13, the system control logic 16 is exemplified, and the circuit block operates by the second power supply voltage Vd2. In addition, a gate driver 15 is illustrated as a circuit block disposed in the primary power supply area 11, which operates by the first power supply voltage Vd1. As will be described later, the DC-DC converter 14 is disposed over both the primary power supply area 11 and the system power supply area 13, and operates by the first power supply voltage Vd1 and the second power supply voltage Vd2.

The flash memory 17 stores, for example, programs for achieving desired functions to be realized by the semiconductor device 10. The processor 18 reads and executes the programs stored in the flash memory 17, thereby achieving a desired function in the semiconductor device 10. The static memory 19 is used, for example, to store data when a program is executed, and the peripheral logic is used, for example, to transmit data to and receive data from other semiconductor device included in system 1 when the program is executed.

In the first embodiment, the control parameter 21 of DC-DC converter 14 is also stored in advance in the flash memory 17. A control program relating to the DC-DC converter is also stored in advance in the flash memory 17. The processor 18 reads the control parameter 21 from the flash memory 17 by executing the control program, and supplies the read control parameter 21 to the system control logic 16 and the DC-DC converter 14.

The DC-DC converter 14, as described in detail with reference to FIG. 2 and the like later, includes a digital control loop, an analog control loop, and a mode switching circuit. The digital control loop is set characteristic by the supplied control parameter 21, and generates a PWM signal. In this first embodiment, the analog control loop generates a Pulse Frequency Modulation (PFM) signal. The mode switching circuit selects a PWM or PFM signal, and the selected signal is provided to the gate driver 15 as a gate drive signal 22. In the figure, the gate drive signal 22 is shown as one signal, of course may be a plurality of signals.

The gate driver 15 generates gate signals 23P and 23N based on the gate drive signal 22 supplied, and supplies to the external terminals T2 and T3.

The external terminals T1 to T4, an external switching circuit 30 provided on the outside of semiconductor device 10 is coupled.

Without particular limitation, the switching circuit 30 in the first embodiment includes transistors MP1, MN1, an inductor Lout, and a capacitor Cout. In the first embodiment, the transistor MP1 includes a P-channel type MOSFET and the transistor MN1 includes an N-channel type MOSFET. Of course, the transistors MP1, MN1 are not limited to MOSFET, it may be an IGBT or the like.

The transistors MP1 and MN1 are coupled such that each of the source-drain paths are in series between the first power supply voltage Vd1 and the grounding voltage Vs, and the drain of the transistor MP1 and the drain of the transistor MN1 are coupled each other. Further, the gate of the transistor MP1 is coupled to the external terminal T2, the gate of the transistor MN1 is coupled to the external terminal T3. The drain of the transistor MP1 and the drain of the transistor MN1 are coupled to one end of the inductor Lout. Further, a capacitor Cout is coupled between the other end of the inductor Lout and the ground voltage Vs, and the output voltage Vout from the other end of the inductor Lout is output to the external terminal T4.

Although omitted in the figure, a reference voltage is supplied, and the DC-DC converter 14 outputs the gate drive signal 22 that changes over time, so as to match the voltage value of the output voltage Vout with the reference voltage. In accordance with the gate drive signal 22, the gate driver 15 provides temporally varying gate signals 23P, 23N to the gate of the transistor MP1, MN1. Thus, the transistors MP1, MN1 performs a switching operation, and a current that changes temporally flows into the inductor Lout and the capacitor Cout, thereby the voltage value of the output voltage Vout is changed, so that the output voltage Vout matching the reference voltage is output.

Although not particularly limited, the first power supply voltage Vd1 and the second power supply voltage Vd2 are the same voltage value, for example, 3.3 V~5 V. The voltage value of the output voltage Vout when matched to the reference voltage is, for example, 1.8 V. Since the first power supply voltage Vd1 and the second power supply voltage Vd2 is the same voltage value, for example, without providing the external terminal T5 to semiconductor device 10, the system power supply area 13 may be powered the first power supply voltage Vd1 from the external terminal T1. However, in the switching circuit 30, since the transistors MP1, MN1 perform a switching operation, there is a possibility that the noise caused by the switching operation is transmitted to the system power supply area 13. Therefore, it is desirable to provide the first power supply voltage Vd1 and the second power supply voltage Vd2 separately.

Figure 2:
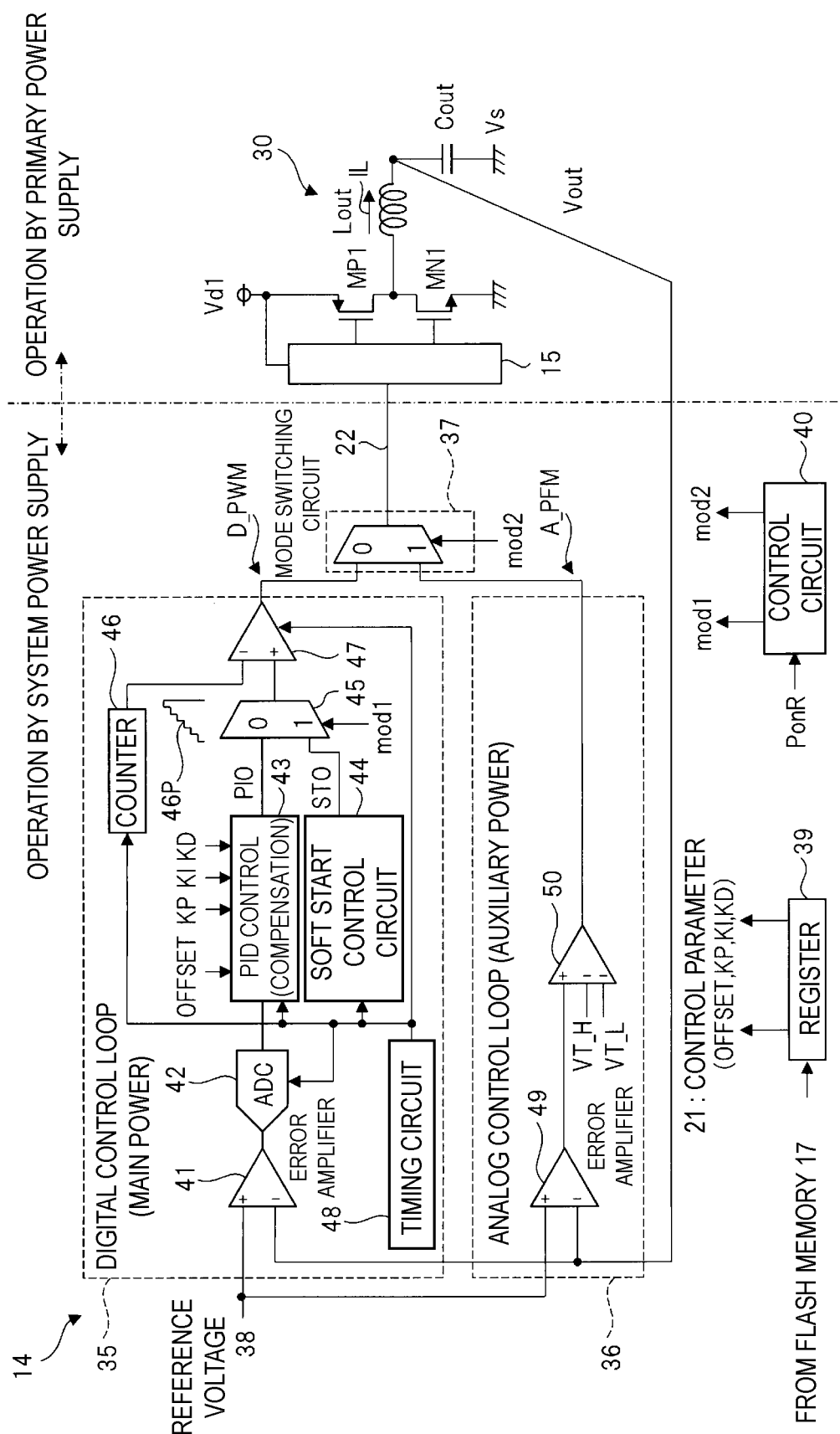
FIG. 2 is a circuit diagram showing a configuration of a DC-DC converter according to the first embodiment.

(Configuration of DC-DC converter) FIG. 2 is a circuit diagram showing a configuration of a DC-DC converter according to the first embodiment. In the figure, the one-dot chain line is a virtual line for separating the area operating by the primary power supply where the first power supply voltage Vd1 is fed, and an area operating by the system power supply where the second power supply voltage Vd2 is fed. The primary power supply area 11 described in FIG. 1 and the switching circuit 30 are disposed in the area operating by the primary power supply. The system power supply area 13 described with reference to FIG. 1 is disposed in the area operating by the system power supply. In FIG. 2, unlike FIG. 1, there is shown an example in which the circuit blocks constituting DC-DC converter 14 are disposed in an area operating by a system power supply, but are not limited thereto.

In FIG. 2, since the switching circuit 30 and the gate driver 15 are the same as in FIG. 1, the description thereof will be omitted.

The DC-DC converter 14 includes a digital control loop 35, an analog control loop 36 which is coupled in parallel with the digital control loop 35, and a mode switching circuit 37. Also, although not specifically limited, the system control logic 16 shown in FIG. 1 includes a register 39 and control circuit 40. Of course, both the register 39 and the control circuit 40 may be provided in the DC-DC converter 14 without being provided in the system control logic 16. Next, a description will be given of a digital control loop 35 and the analog control loop 36.

(Digital control loop) Digital control loop 35 includes an error amplifier 41, an ADC circuit 42, a PID control circuit 43, a soft start control circuit 44, a selector 45, a comparator 47, a counter 46, and a timing circuit 48.

The error amplifier 41 includes an input terminal (+) to which the reference voltage 38 is supplied, and an input terminal (−) to which the output voltage Vout is supplied. The error amplifier 41 detects the potential difference between the reference voltage 38 supplied to the input terminal (+) and the output voltage Vout supplied to the input terminal (−), and outputs an error signal corresponding to the error (analog signal) to the ADC circuit 42. The ADC circuit 42 converts the error signal into a corresponding digital signal, and outputs to the PID control circuit 43.

The PID control circuit 43 is supplied the control parameter 21 from the register 39. As the control parameter 21, an offset constant OFFSET relating to the voltage offset, a proportional constant KP relating to proportionality, a differential constant KD relating to derivative, and an integral constant KI relating to integration are supplied, and set to the PID control circuit 43. Transfer function of the PID control circuit 43 is determined by the proportional constant KP, the differential constant KD and the integral constant KI, and the level of the propagating signal is adjusted according to the offset constant OFFSET. The PID control circuit 43 functions as a compensation circuit, by changing the proportional constant KP, the differential constant KD, the integral constant KI and the offset constant OFFSET in accordance with a change in the phase or the like of the output voltage Vout supplied to the digital control loop 35, the PID control circuit 43 changes the characteristic, and performs appropriate compensation for the output voltage Vout supplied to the digital control loop 35.

The soft start control circuit 44 is a circuit for suppressing a huge inrush current flows in the current path when, for example, the first power supply voltage Vd1, the second power supply voltage Vd2 are turned on and the DC-DC converter 14 is initiated. If not provided with a soft start control circuit 44, when DC-DC converter 14 is initiated, there is a huge rush current flows in the current path including a transistor MP1 or the like. The huge inrush current causes, for example, the voltage drop of the first power supply voltage Vd1 or/and the breakdown (burnout) of elements constituting the current path. Further, the output voltage Vout rises rapidly, and overshoot occurs in the output voltage Vout. The soft start control circuit 44, when DC-DC converter 14 is initiated, starts operation before the PID control circuit 43, and outputs a signal for controlling the transistor MP1 so that the output voltage Vout is gradually increased. In FIG. 2, the soft start control circuit 44 is provided in the digital control loop 35 is not limited thereto. For example, the soft start control circuit 44 may be provided in the analog control loop 36 or outside of the DC-DC converter 14.

The PID output signal PIO output from the PID control circuit 43 is supplied to the input terminal of the selector 45 (0), the soft start signal STO output from the soft start control circuit 44 is supplied to the input terminal of the selector 45 (1). The selector 45 selects and outputs the PID output signal PIO or the soft start signal STO according to the logical value of the mode switch signal mod1. The selector 45 selects the soft start signal STO supplied to the input terminal (1) when the mode switch signal mod1 is a logical value "1", and selects the PID output signal PIO supplied to the input terminal (0) when the mode switch signal mod1 is a logical value "0".

The output of the selector 45 is supplied to the input terminal (+) of the comparator 47. On the other hand, the input terminal (−) of the comparator 47, the output signal of the counter 46 is supplied. The counter 46 counts the clock signal from timing circuit 48 to generate a sawtooth (comparison signal) as shown as 46P in FIG. 2. That is, the counter 46 generates a periodic sawtooth wave whose value rises from the initial value over time and returns to the initial value when a predetermined value is reached. Incidentally, the timing circuit 48 also generates a synchronous signal for the ADC circuit 42, the PID control circuit 43, the soft start control circuit 44 and the comparator 47 or the like, and supplies to these circuit blocks.

The comparator 47 compares the voltage value of the output of the selector 45 supplied to the input terminal (+) and the voltage value of the saw wave supplied to the input terminal (−), and supplies the PWM signal D_PWM whose duty is determined in accordance with the voltage value of the output of the selector 45 to the input terminal (0) of the mode switching circuit 37.

(Analog control loop) The analog control loop 36 includes an error amplifier 49, and a comparator 50. The error amplifier 49 includes an input terminal (+) to which the reference voltage 38 is supplied and an input terminal (−) to which the output voltage Vout is supplied, and outputs a potential difference between the reference voltage 38 and the output voltage Vout as an error signal of analog.

The comparator 50 includes an input terminal (+) to which the error signal is supplied from the error amplifier 49, and two input terminals (−) to which the high side threshold voltage VT_H and the low side threshold voltage VT_L are supplied respectively. The comparator 50 performs a comparison between the voltage value of the error signal and the threshold voltage VT_H, VT_L, and outputs a PFM signal of the voltage according to the result of the comparison. For example, if the error signal exceeds the threshold voltage VT_H, the comparator 50 makes the PFM signal a high level and if it falls below the threshold voltage VT_L, the comparator 50 changes the PFM signal to a low level.

Figure 11A:
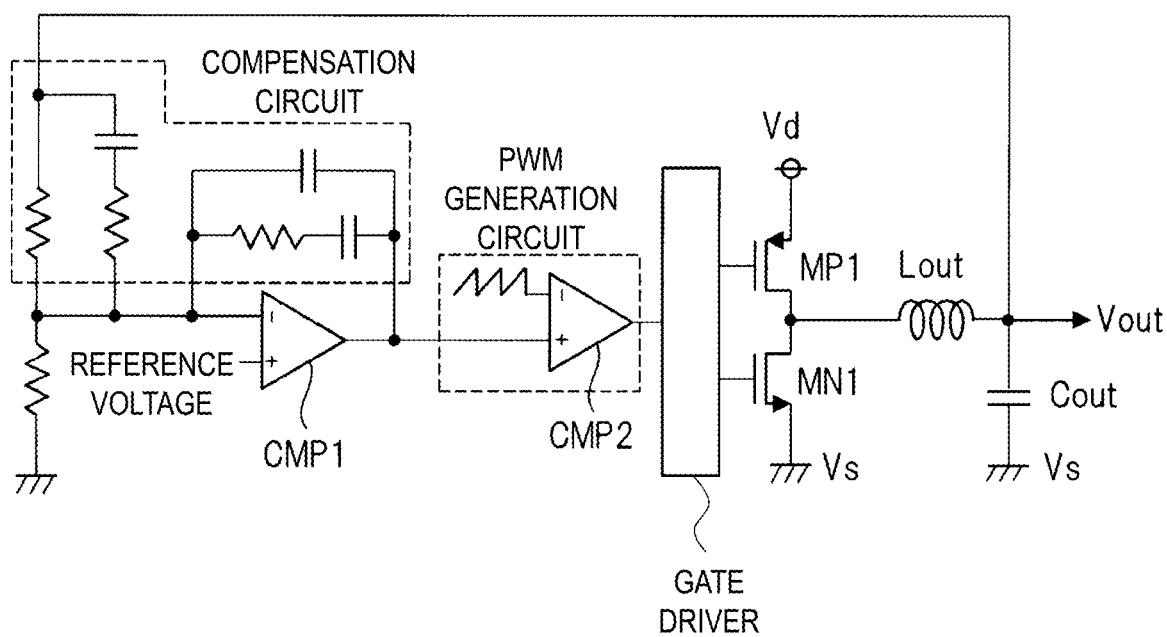
FIG. 11A is a diagram showing a configuration of an analog-controlled DC-DC converter.
Figure 11B:
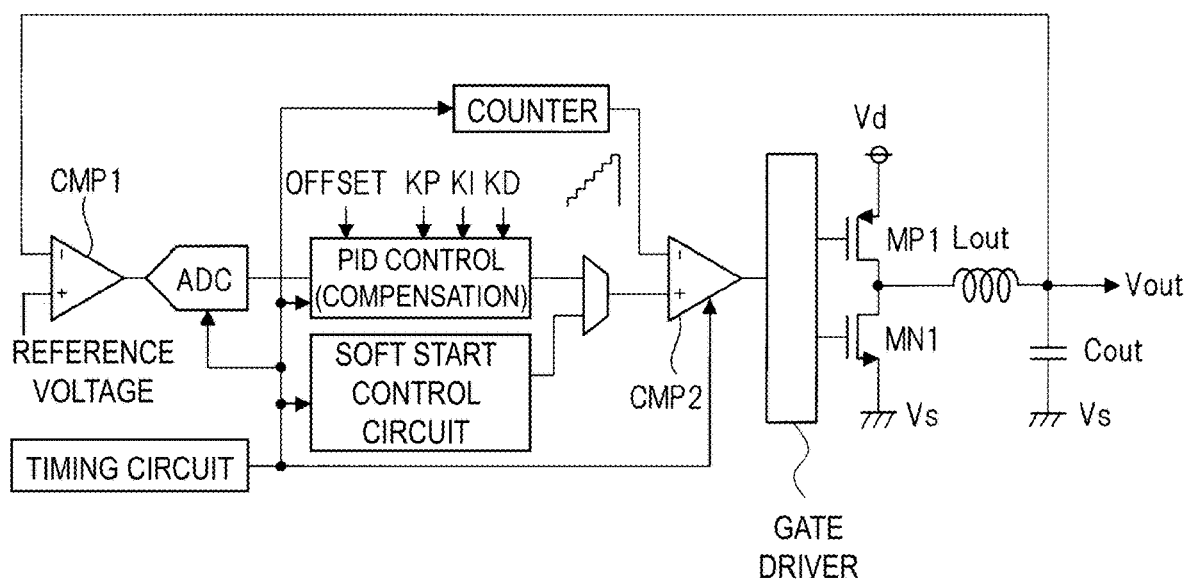
FIG. 11B is a diagram showing a configuration of a digital-controlled DC-DC converter.

In the first embodiment, the analog control loop 36 will be described as an example of generating a PFM signal based on the difference between the output voltage Vout and the reference voltage 38, but it is not limited thereto. For example, as shown in FIG. 11A, the analog control loop as well as the digital control loop may be to generate a PWM signal. The characteristics of the error amplifier 49 and the comparator 50 are predetermined ones. Therefore, the characteristics of the analog control loop 36, even in the analog control loop to generate a PWM signal or the analog control loop to generate a PFM signal, have become those predetermined. That is, the characteristics of the analog control loop 36 is difficult to change by the control parameter 21 as in the digital control loop 35 comprising a PID control circuit 43. In other words, the analog control loop 36 may be a control loop that does not require the control parameter 21.

In the DC-DC converter 14 according to the first embodiment, the digital control loop 35 functions as a control loop constituting the main power supply with respect to the secondary power supply area 12, the analog control loop 36 functions as a control loop constituting an additional auxiliary power supply for functioning the digital control loop 35 constituting the main power supply. That is, the analog control loop 36 functions to supply the power required to read the control parameter 21 from the flash memory 17 and transfer to the PID control circuit 43. The analog control loop 36 may be configured within the range capable of supplying the power. Therefore, in the first embodiment, to minimize the area overhead spent in the analog control loop 36, the configuration of the PFM control, which simplifies the circuit, is employed in the analog control loop 36.

The PFM signal output from the comparator 50, as a PFM signal A_PFM, is supplied to the input terminal (1) of the mode switching circuit 37.

The mode switch signal mod2 is supplied to the mode switching circuit 37. The mode switching circuit 37, according to the logical values of the mode switch signal mod2, selects the PFM signal A_PFM supplied to the input terminal (1) or the PWM signal D_PWM supplied to the input terminal (0), and outputs as the gate drive signal 22. Although not particularly limited, in the first embodiment, the mode switching circuit 37 selects the PWM signal D_PWM supplied to the input terminal (0) when the logical value of the mode switch signal mod2 is "0", the mode switching circuit 37 selects the PFM signal A_PFM supplied to the input terminal (1) when the logical value of the mode switch signal mod2 is "1".

As previously described, the gate driver 15 generates the output voltage Vout by switching operation of the transistor MP1, MN1 based on the gate drive signal 22. The output voltage Vout generated is supplied to the secondary power supply area 12 shown in FIG. 1, and supplied to the error amplifier 41 and 49. Accordingly, the flash memory 17 and the processor 18 or the like disposed in the secondary power supply area 12 operates, the error between the reference voltage 38 and the output voltage Vout in the error amplifier 41 and 49 is determined.

The mode switching circuit 37 selects the PWM signal D_PWM or the PFM signal A_PFM based on the mode switch signal mod2. In other words, the digital control loop 35 or the analog control loop 36 is selected by the mode switch signal mod2. As a result, the selected control loop, the gate driver 15 and the switching circuit 30 generate the feedback path so that the voltage value of the output voltage Vout matches the value of the reference voltage 38.

The operation is as follows when the PFM signal A_PFM is selected. That is, the error signal from the error amplifier 49 is lowered when the output voltage Vout exceeds the reference voltage 38, and then the comparator 50 makes the PFM signal A_PFM a low level when the error signal is below the threshold voltage VT_L. This low level PFM signal A_PFM is supplied to the gate driver 15 as a gate driver signal 22, the gate driver 15 turns off the transistor MP1. When the output voltage Vout exceeds the reference voltage 38, since the transistor MP1 is turned off, the output voltage Vout is lowered so that the error between the output voltage Vout and the reference voltage 38 is reduced. Conversely, if the output voltage Vout falls below the reference voltage 38, then the error signal rises, and if it rises above the threshold VT_H, the comparator 50 makes the PFM signal A_PFM a high level. This high level PFM signal A_PFM is supplied to the gate driver 15 as the gate driver signal 22, and the gate driver 15 turns on the transistor MP1. Thus, the output voltage Vout rises so that the difference between the reference voltage 38 and the output voltage Vout is reduced.

In the register 39 shown in FIG. 2, the processor 18 executes the control program and then writes the control parameter 21 read from the flash memory 17. The control parameter 21 stored in the register 39 is supplied to the PID control circuit 43.

The mode switch signal mod1 and mod2 described above are generated by the control circuit 40. In the first embodiment, the control circuit 40 generates a mode switch signal mod1 and mod2 based on the power-on reset signal PonR. Although not particularly limited, the system control logic 16 shown in FIG. 1 includes a power-on reset circuit (not shown). In the first embodiment, when both the first power supply voltage Vd1 and the second power supply voltage Vd2 are turned on, the power-on reset circuit outputs the power-on reset signal PonR.

Figure 3:
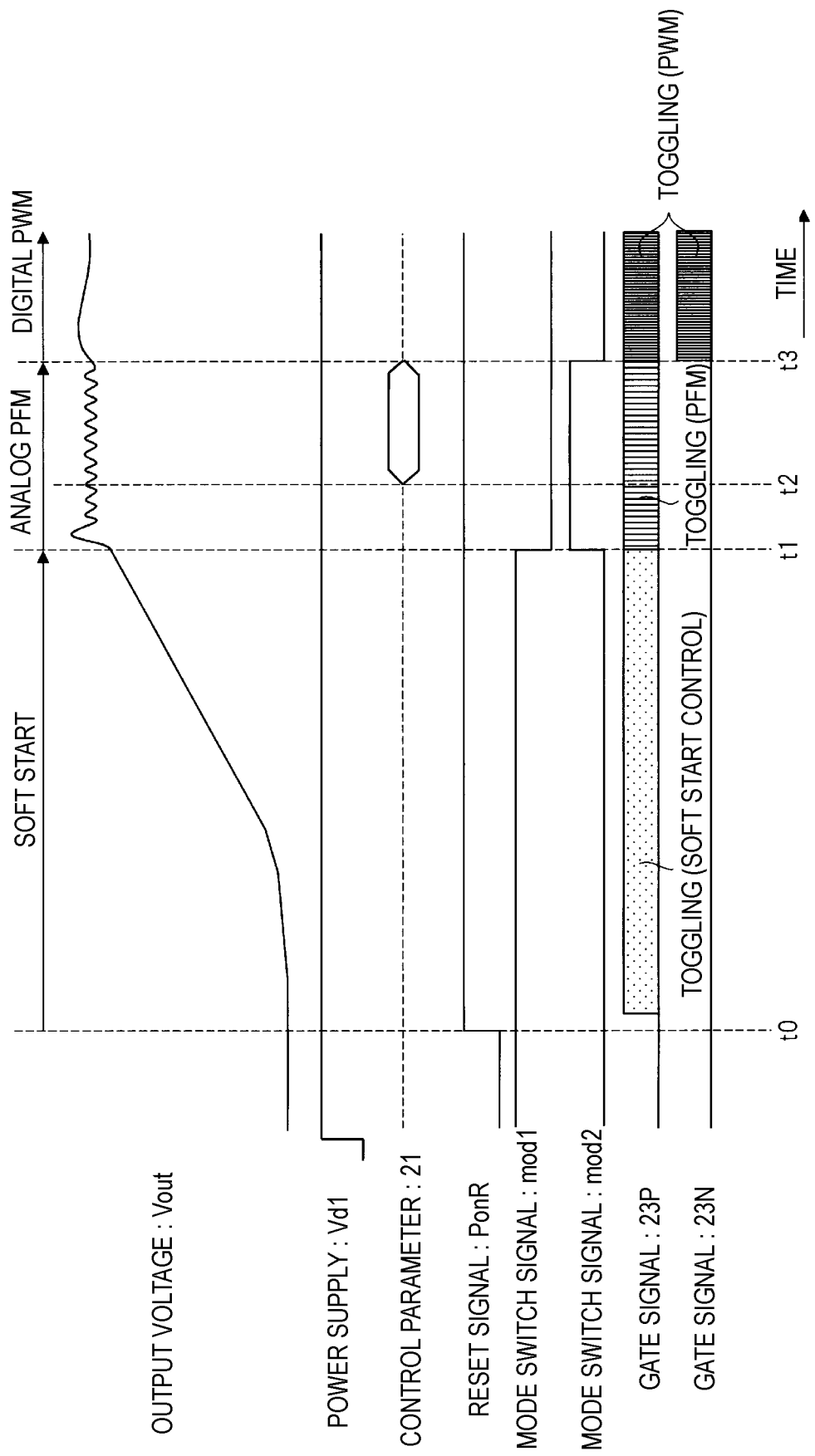
FIG. 3 is a waveform diagram showing the operation of the DC-DC converter according to the first embodiment.

(Operation of DC-DC converter) FIG. 3 is a waveform diagram showing the operation of the DC-DC converter 14 according to the first embodiment. In FIG. 3, the waveforms of the control signals and the output voltage Vout during startup of the DC-DC converter 14 of FIG. 2 are shown. Hereinafter, with reference to FIGS. 2 and 3, the operation of the DC-DC converter 14 will be explained.

By turning on both the first power supply voltage Vd1 and the second power supply voltage Vd2, the first power supply voltage Vd1 and the second power supply voltage Vd2 become predetermined potentials. In order to avoid the drawings are complicated, only the first power supply voltage Vd1 is shown, and thereafter the first power supply voltage Vd1 will be described.

When the first power supply voltage Vd1 reaches a predetermined potential, the power-on reset circuit changes the power-on reset signal PonR to a low level. When a predetermined time has elapsed after changing the power-on reset signal PonR to the low level (logical value "0"), the power-on reset circuit releases the power-on reset. That is, at time t0, the power-on reset circuit changes the power-on reset signal PonR to a high level (logical value "1").

Although not particularly limited, by the power-on reset signal PonR being "0", the control circuit 40 of FIG. 2 changes the mode switch signal mod1 to "1", the mode switch signal mod2 to "0". By the mode switch signal mod1 being set to "1", the selector 45 selects the input terminal (1). Further, by the mode switch signal mod2 being set to "0", the mode switching circuit 37 selects the input terminal (0).

Thus, the soft start signal STO of the soft start control circuit 44 is supplied to the comparator 47 through the selector 45. In comparator 47, the saw wave and the soft start signal STO are compared, and the PWM signal D_PWM according to the result of the comparison is output from the comparator 47. The PWM signal D_PWM is supplied to the gate driver 15 via the mode switching circuit 37. The gate driver 15 outputs a gate signal 23P and 23N according to the supplied PWM signal D_PWM. The transistors MP1 and MN1 initiate operation in accordance with the supplied gate signals 23P and 23N. In FIG. 3, in accordance with the gate signal 23P, a toggling operation in which the transistor MP1 repeats the on state and off state is performed. By the transistor MP1 performing a toggling operation, the switching circuit 30 gradually increases the voltage value of the output voltage Vout. That is, the soft start control circuit 44 operates, so that the voltage value of the output voltage Vout is gradually increased.

By this output voltage Vout, the flash memory 17, the processor 18, the static memory 19 and the peripheral logic 20 or the like disposed in the secondary power supply area 12 in FIG. 1 are initiated, and starts operation.

When the voltage value of the output voltage Vout reaches a predetermined voltage value, the control circuit 40 changes the mode switch signal mod1 to "0", and changes the mode switch signal mod2 to "1". In FIG. 3, at time t1, the output voltage Vout has reached the predetermined voltage value. By the mode switch signal mod1 and mod2 being "0" and "1" respectively, the selector 45 selects the input terminal (0) and the mode switching circuit 37 selects the input terminal (1). Because the mode switching circuit 37 selects the input terminal (1), PFM signal A_PFM generated by the analog control loop 36 is supplied to the gate driver 15.

The gate driver 15 outputs a gate signal 23P, 23N according to the PFM signal A_PFM supplied. In the example shown in FIG. 3, the gate driver 15 outputs a gate signal 23P for toggling the transistor MP1. Thus, the switching circuit 30 maintains the voltage value of the output voltage Vout at a voltage above a predetermined voltage value. That is, the voltage value of the output voltage Vout is maintained above a predetermined voltage value by the PFM signal A_PFM generated by the analog control loop 36.

In the first embodiment, during the analog PFM period in which the output voltage Vout is maintained above a predetermined voltage value by the PFM signal A_PFM generated by the analog control loop 36, the processor 18 reads the control parameter 21 from the flash memory 17, transfers the control parameter 21 to the register 39, and writes to the register 39. In FIG. 3, at time t2, the processor 18 reads the control parameter 21 from the flash memory 17 and starts transferring and writing to the register 39. The transfer and writing of the control parameter 21 to the register 39 ends at time t3.

When the writing of the control parameter 21 to the register 39 is completed, the control parameter 21 is set to the PID control circuit 43. Of course, the transfer of the control parameter 21 to the register 39 and the setting of the control parameter 21 from the register to the PID control circuit 43 may be performed in parallel in time.

When the setting of the control parameter 21 to the PID control circuit 43 is completed, the control circuit 40, while maintaining the mode switch signal mod1 to "0", switches the mode switch signal mod2 to "0". By the mode switch signal mod2 changing to "0", the mode switching circuit 37 selects the input terminal (0). At this time, the comparator 47 compares the PID output signal PIO of the PID control circuit 43 which is output through the selector 45 and the saw wave, and outputs a PWM signal D_PWM according to the comparison result. Therefore, the mode switching circuit 37 outputs the PWM signal D_PWM to the gate driver 15, and the gate driver 15 outputs a gate signals 23P, 23N based on the PID output signal PIO. The transistors MP1, MN1 performs toggling operation by the gate signals 23P, 23N, and the switching circuit 30 outputs an output voltage Vout corresponding to the PWM signal D_PWM.

In FIG. 3, a period in which the output voltage Vout is generated based on the PID output signal PIO of the PID control circuit 43 is shown as "DIGITAL PWM". Further, in FIG. 3, a period in which the output voltage Vout is generated based on the PFM signal A_PFM is shown as "ANALOG PFM", and a period in which the output voltage Vout is generated based on the soft start signal STO is shown as "SOFT START". The output voltage Vout generated during the digital PWM period is used as a main power source of such as the flash memory 17, the processor 18, the static memory 19 and the peripheral logic 20 shown in FIG. 1. The voltage values of the output voltage Vout generated in the analog PFM period and the output voltage generated in the digital PWM period is, for example, the same, but the output voltage Vout generated in the analog PFM period is an auxiliary power supply for appropriately operating the digital control loop 35 that generates a main power supply.

The soft start period is a period for preventing extremely large inrush current occurs when the first power supply voltage Vd1 (and the second power supply voltage Vd2) is turned on, and the DC-DC converter 14 is initiated. In the first embodiment, when the power supply voltage Vd1 is turned on, the DC-DC converter 14 transitions from the soft start period, to the analog PFM period, and to the digital PWM period in the order.

The transition from the soft start period to the analog PFM period, as described above, is performed when the voltage value of the output voltage Vout reaches a predetermined voltage. In the first embodiment, although not particularly limited, when a predetermined time has elapsed since the reset is released, as the output voltage Vout regarded to have reached a predetermined voltage, the transition from the soft start period to the analog PFM period is performed. That is, the control circuit 40 determines whether a predetermined time has elapsed from the time t0 when the reset signal PonR is changed to "1", and changes the logical values of the mode switch signal mod1 and mod2 at a time t1 when a predetermined time has elapsed. Of course, the present invention is not limited thereto. For example, by supplying a predetermined voltage of the control circuit 40, the output voltage Vout and a predetermined voltage are compared, and logical values of the mode switch signal mod1 and mod2 may be changed based on the comparison result.

The control circuit 40 according to the first embodiment determines whether or not a predetermined time has elapsed from the time t0 when the reset is released, and if it is a time t3 when the predetermined time has elapsed, the transition from the analog PFM period to the digital PWM period is performed by changing the logical values of the mode switch signal mod2.

In FIG. 3, for example, at a time t2 in the analog PFM period, the processor 18 reads the control parameter 21 from the flash memory 17, and starts transfer and writing to the register 39, but it is not limited thereto. For example, when the output voltage Vout reaches a voltage value of stably operating the processor 18, the flash memory 17, and the like in the soft start period, the time t2 may be in the soft start period.

In the first embodiment, the soft start period or/and analog PFM period can be used to initiate the flash memory 17 and processor 18 originally installed in the semiconductor device 10, and then the initiated flash memory 17 and the processor 18 can be utilized to transition the semiconductor device 10 to a state in which normal operation can be performed (a state in which it operates by the main power supply), thereby preventing it from falling into a deadlock state. The PID control circuit 43 is set to have a characteristic suitable for the switching frequency of the transistors MP1, MN1, and the values of the inductor Lout and the capacitor Cout or the like included in the switching circuit 30 by the control parameter 21. Therefore, it is possible to provide a digital-controlled DC-DC converter 14 capable of stable feedback operation while suppressing any increase in area.

Generally, when comparing the PFM control and the PWM control, the power efficiency of DC-DC converter 14 at low loads is higher in the PFM control. Therefore, not only during startup of the flash memory 17 and the processor 18, but also during the power saving mode of the semiconductor device 10 for reducing the operating current of the processor 18, the DC-DC converter 14 may be switched so as to operate in the PFM control. That is, in the power saving mode or the like, the mode switch signal mod2 may be controlled so as to be "1". Thus, the output voltage Vout is generated based on the PFM signal A_PFM generated by the analog control loop 36.

Figure 9:
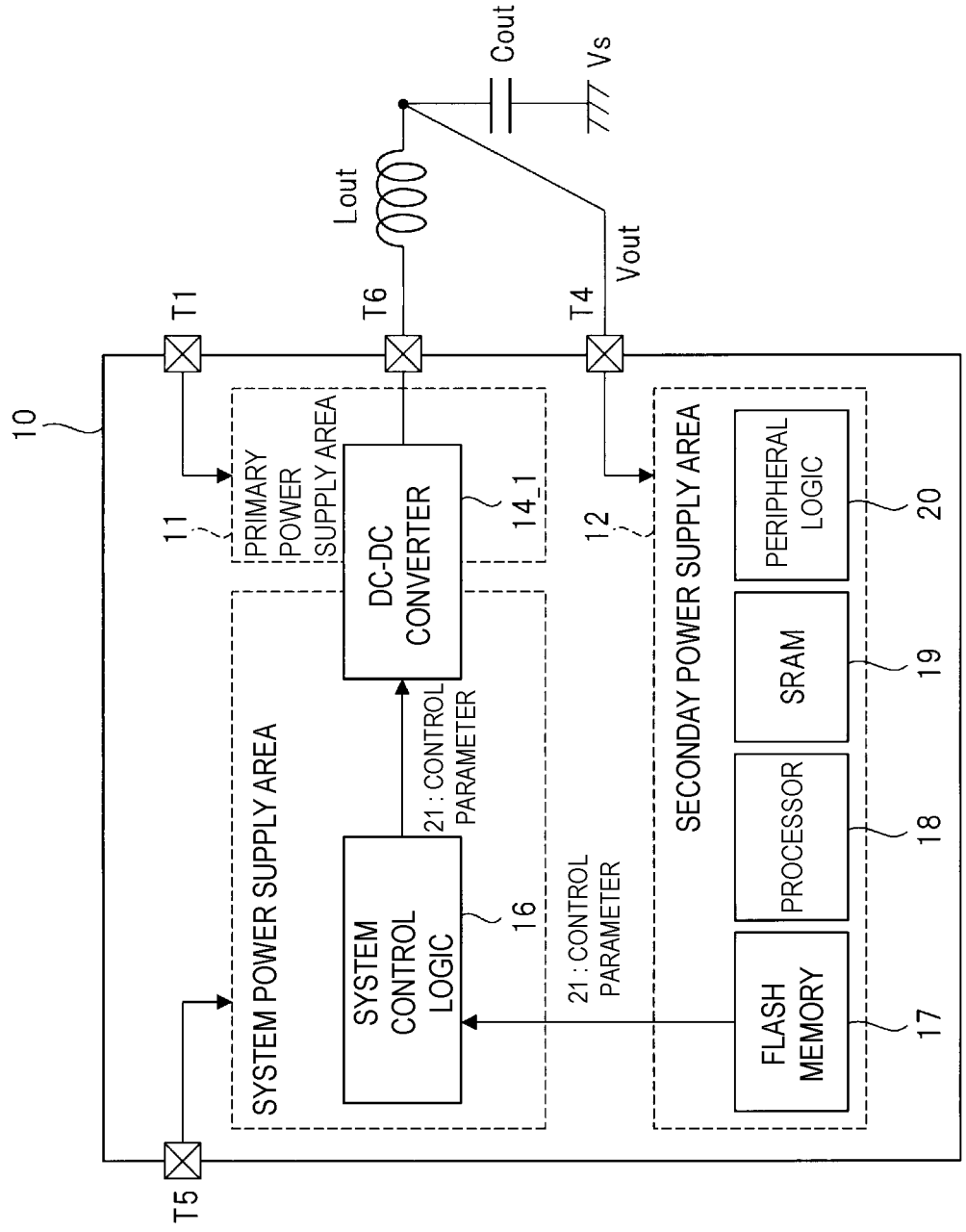
FIG. 9 is a block diagram showing another configuration of the semiconductor device according to the first embodiment.
Figure 10:
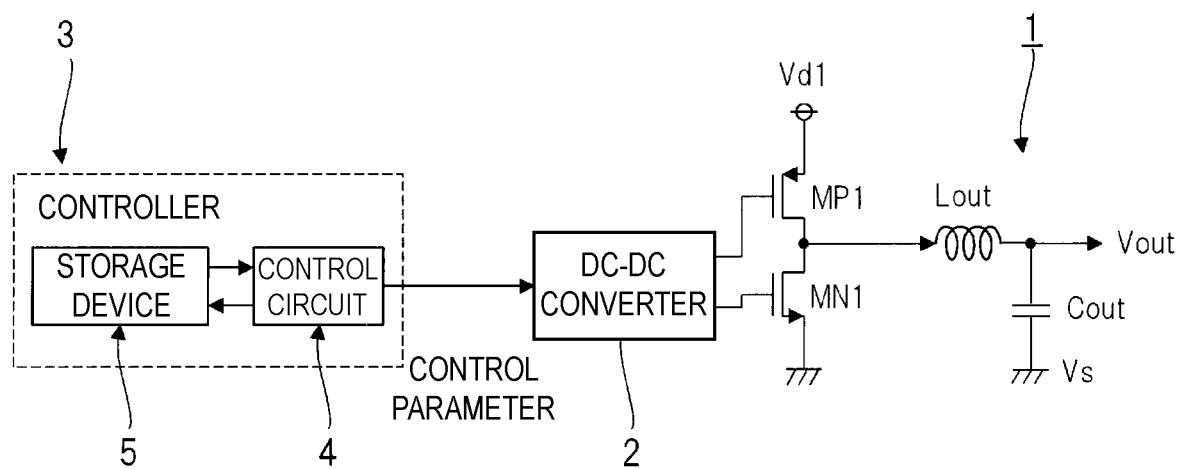
FIG. 10 is a circuit diagram showing a schematic configuration of a system that the present inventors have studied prior to the present invention.

In FIG. 1, an example of transistors MP1, MN1 provided outside the semiconductor device 10 has been described, but is not limited thereto. For example, as shown in FIG. 9, the transistors MP1, MN1 shown in FIG. 1 may be incorporated in the semiconductor device 10. FIG. 9 is a block diagram showing another configuration of the semiconductor device related to the first embodiment. In FIG. 9, DC-DC converter 14_1 includes the DC-DC converter 14, the gate driver 15, and the transistors MP1, MN1 shown in FIG. 1. In this case, the coupling node between the transistors MN1 and MP1 is coupled to the external terminal T6, and the inductor Lout and the capacitor Cout are coupled in series between the external terminal T6 and the ground voltage Vs.

Figure 4:
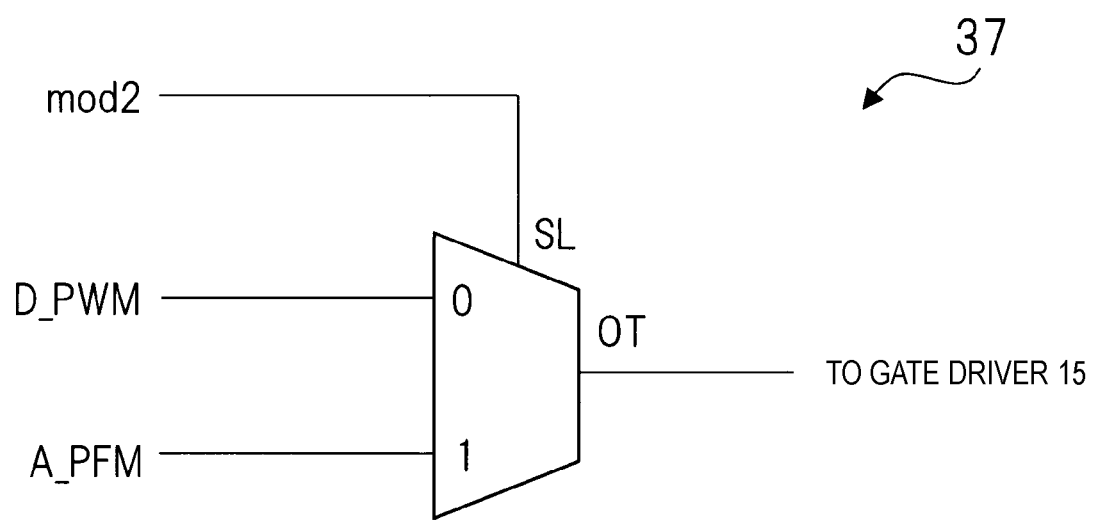
FIG. 4 is a block diagram showing the configuration of the mode switching circuit according to the first embodiment.

(Second Embodiment) FIG. 4 is a block diagram showing the configuration of the mode switching circuit 37 according to the first embodiment. The mode switching circuit 37 shown in FIG. 4 comprises a selector 37S including an input terminal (0), another input terminal (1), a selection terminal SL and an output terminal OT. The PWM signal D_PWM is supplied from the output terminal OT to the gate driver 15 when the mode switch signal mod2 supplied to the selection terminal SL is "0", and the PFM signal A_PFM is supplied to the gate driver 15 when the mode switch signal mod2 is "1".

The selector 37S, since it is possible to make a simple configuration, it is possible to suppress an increase in area by configuring the mode switching circuit 37 in a simple circuit. However, when switching the PFM signal A_PFM and the PWM signal D_PWM asynchronously by the mode switching circuit 37, a relatively large overshoot in the output voltage Vout may occur. This is because the output voltage Vout may change significantly when switching from PFM control to PWM control asynchronously, since the change in the output voltage Vout (ripple) is large in the PFM control as compared with the PWM control.

Figure 5:
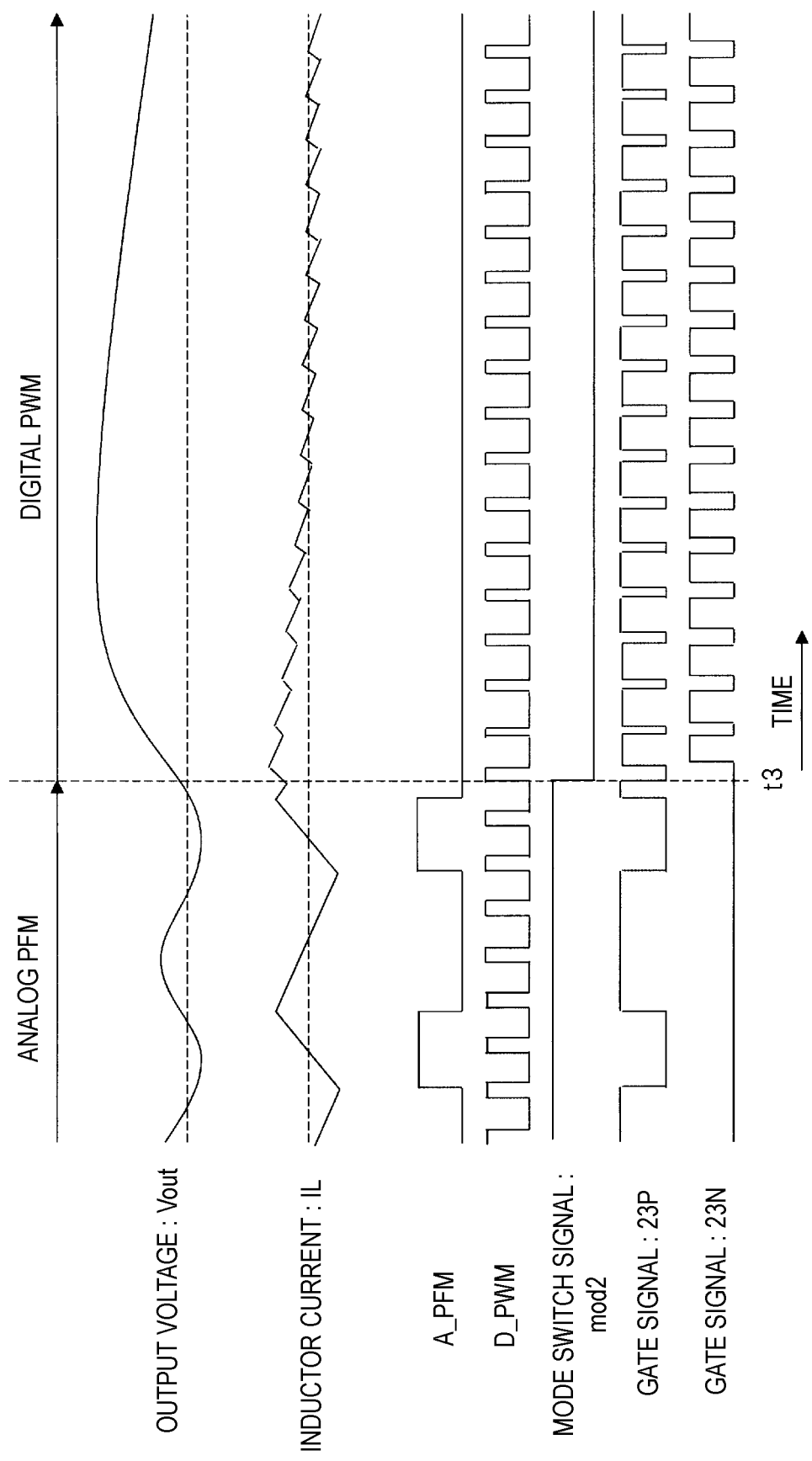
FIG. 5 is a waveform diagram showing a waveform of the DC-DC converter using the mode switching circuit shown in FIG. 4.

Next, a case where a relatively large overshoot occurs due to asynchronous switching will be described with reference to the drawings. FIG. 5 is a waveform diagram of the DC-DC converter 14 using the mode switching circuit shown in FIG. 4. FIG. 5 corresponds to a waveform diagram showing the waveform in more detail at the time t3 vicinity in the waveform diagram shown in FIG. 3. Further, in FIG. 5, IL shows the inductor current flowing through the inductor Lout shown in FIGS. 1 and 2, A_PFM shows the PFM signal A_PFM, and D_PWM shows the PWM signal D_PWM.

At time t3, the mode switch signal mod2 is switched from "1" to "0", and the transition from the analog PFM period to the digital PWM period is performed.

In the analog PFM period, when the PFM signal A_PFM is set to "1", the gate driver 15 sets the gate signal 23P to "0", and when the PFM signal A_PFM is set to "0", the gate driver 15 sets the gate signal 23P to "1". When the gate signal 23P is "0", the transistor MP1 is turned on and the inductor current IL rises. In contrast, when the gate signal 23P is "1", the transistor MP1 is turned off, the inductor current IL drops. By the change in the inductor current IL, the output voltage Vout varies to match the reference voltage 38. In the PFM control, the frequency of the PFM signal changes by the error between the output voltage Vout and the reference voltage 38, but the amount of change in the inductor current IL controlled during one cycle, i.e., control amount, is relatively large as shown in FIG. 5 since one cycle of the PFM signal A_PFM is relatively long.

As shown in FIG. 5, during PFM control, when switched to PWM control immediately after the transistor MP1 is switched from the on state to the off state, i.e. while the inductor current IL is near the peak, overshoot occurs in the output voltage Vout. One cycle of the PWM signal D_PWM is shorter than one cycle of the PFM signal A_PFM. Therefore, the amount of change in the inductor current IL controlled during one cycle of the PWM signal D_PWM is smaller than the amount of change in the inductor current IL controlled during one cycle of the PFM signal A_PFM. As a result, it takes time for the inductor current IL to return to the equilibrium state from a state of exceeding the desired output current, so that the output voltage Vout is relatively large overshoot.

As in the flash memory 17 and the processor 18, the circuit block to which the output voltage Vout is supplied as a power supply voltage is advancing in miniaturization and voltage reduction, the acceptable range of the voltage variation of the power supply voltage tends to be greatly limited. Therefore, it is essential to suppress the overshoot of the output voltage Vout.

Figure 6:
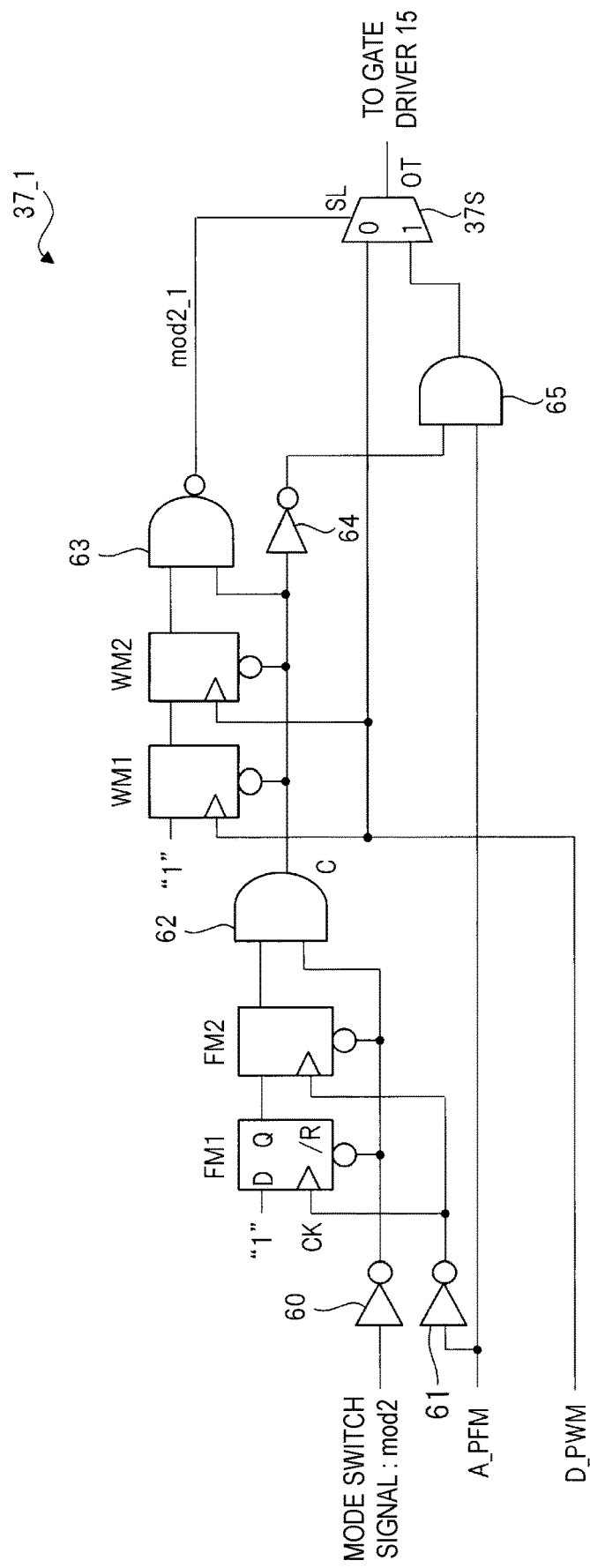
FIG. 6 is a block diagram showing the configuration of the mode switching circuit according to a second embodiment.

FIG. 6 is a block diagram showing the configuration of the mode switching circuit associated with second embodiment. In FIG. 6, 37_1 shows a mode switching circuit, and is used as a mode switching circuit 37 in the DC-DC converter 14 shown in FIG. 2.

The mode switching circuit 37_1 comprises the selector 37S, the inverter circuit 60, 61, 64, the AND circuit 62, 65, the NAND circuit 63 and the flip-flop circuit (hereinafter, referred to as FF circuit) FM1, FM2, WM1, WM2. The FF circuit FM1, FM2, WM1 and WM2 have the same configuration. To avoid complicated drawings, only for FF circuit FM1, each of the terminals are signed. That is, D indicates the input terminal, Q indicates the output terminal, CK indicates the clock terminal, /R indicates the reset terminal. When "0" is supplied to the reset pin /R, the FF circuit FM1 is reset and then outputs "0" from the output pin Q. Further, when the signal supplied to the clock pin CK changes, the logical value of the input supplied to the input pin D is latched and the latched logical value is output from the output pin Q. Other FF circuit is the same as the FF circuit FM1.

The output terminal Q of the FF circuit FM1 is coupled to the input terminal D of the FF circuit FM2. That is, the FF circuit FM1 and FM2 are subordinately coupled in two stages or in series of two stages. The mode switch signal mod2 inverted by the inverter circuit 60 is supplied to the reset terminal /R of the FF circuit FM1, FM2, and the PFM signal A_PFM inverted by the inverter circuit 61 is supplied to the clock terminal CK of the FF circuit FM1, FM2. A high level of the logical value "1" is supplied to the input terminal D of the FF circuit FM1, and an output from the output terminal Q of the FF circuit FM2 and the inverted mode switch signal mod2 are supplied to the AND circuit 62 (the first logic circuit).

The output terminal Q of the FF circuit WM1 is coupled to the input terminal D of the FF circuit WM2. That is, the FF circuit WM1 and WM2 are also subordinately coupled in two stages or in series of two stages. The output of the AND circuit 62 is supplied to the reset terminals /R of the FF circuit WM1, WM2, the PWM signal D_PWM is supplied to the clock terminal CK of the FF circuit WM1, WM2. A high level of the logical value "1" is supplied to the input terminal D of the FF circuit WM1, and the output signal C of the AND circuit 62 and the output signal from the output terminal Q of the FF circuit WM2 are supplied to the NAND circuit 63 (the second logic circuit).

The output signal C of the AND circuit 62 inverted by the inverter circuit 64, and the PFM signal A_PFM are supplied to the AND circuit 65 (the third logic circuit), and the output of the AND circuit 65 is supplied to the input terminal (1) of the selector 37S. Further, the D_PWM is supplied to the input terminal (0) of the selector 37S. The output of the NAND circuit 63 is supplied to the selection terminal SL of the selector 37S as a mode switch signal mod2_1 after synchronization. The output terminal OT of the selector 37S, similarly to FIG. 4, is coupled to the gate driver 15.

It will be described with reference to the drawings later, the mode switching circuit 37_1 generates a mode switch signal mod2_1 from the mode switch signal mod2 which is switched from "1" to "0" asynchronously with respect to the switching operation of the transistor MP1 when transitioning from the analog PFM period to the digital PWM period. The mode switch signal mod2_1 is a mode switch signal that switches from "1" to "0" at a predetermined timing with respect to the switching operation of the transistor MP1. Thus, it is possible to suppress large overshoot occurs in the output voltage Vout by transitioning from the analog PFM period to the digital PWM period at the timing of the inductor current IL is lowered.

Figure 7:
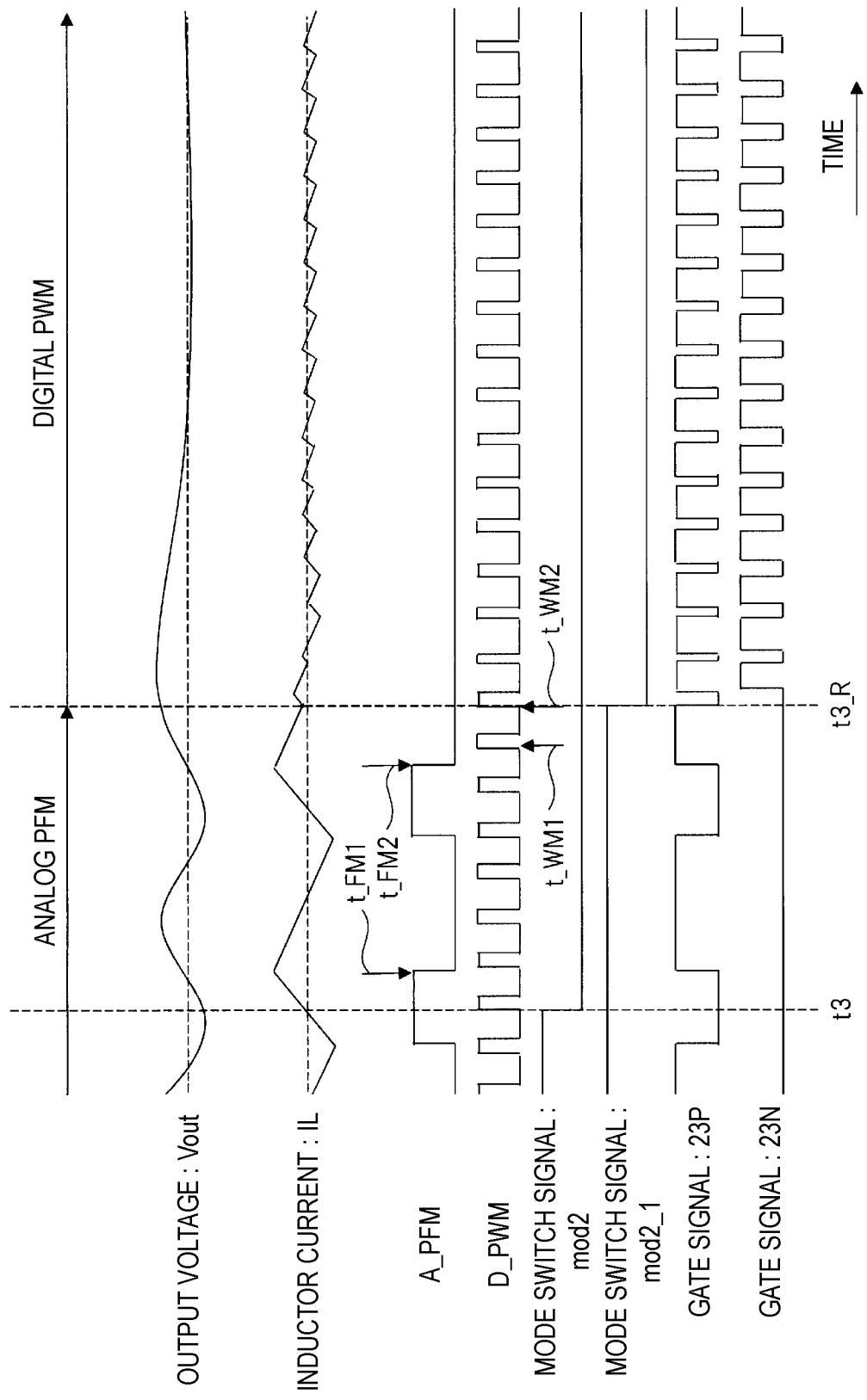
FIG. 7 is a waveform diagram showing the operation of the mode switching circuit according to the second embodiment.

FIG. 7 is a waveform diagram showing the operation of the mode switching circuit according to the second embodiment. Next, the operation of the mode switching circuit 37_1 will be described with reference to FIGS. 6 and 7.

At time t3, a mode switch instruction is issued. That is, the mode switch signal mod2 is changed from "1" to "0". Thus, the reset of the FF circuits FM1, FM2 whose clock signal is the PFM signal A_PFM is released.

In the analog PFM period, when the PFM signal A_PFM changes to "0" at time t_FM1, the FF circuit FM1 captures the logical value "1" supplied to the input terminal D, latches, and outputs "1" from the output terminal Q. Thereafter, the PFM signal A_PFM changes from "0" to "1" and changes to "0" at time t_FM2 again. In response to the change of the PFM signal A_PFM to "0", the FF circuit FM2 captures "1" output from the FF circuit FM1, latches, and outputs.

The AND circuit 62, since the mode switch signal mod2 is "1" and inverted by the inverter circuit 60, changes the output signal C to the logical value "1" when the logical value "1" is output from the FF circuit FM2. Thus, the reset of the FF circuits WM1, WM2 whose clock signal is the PWM signal D_PWM is released.

When the PWM signal D_PWM changes from "0" to "1" at the time t_WM1 after the PFM signal A_PFM changes to "0" at the time t_FM2, the FF circuit WM1 captures, latches, and outputs the logical value "1" supplied to the input terminal D. Thereafter, the PWM signal D_PWM changes to "0", and changes to the logical value "1" at the time t_WM2 again. The change in the PWM signal D_PWM at time t_WM2, FF circuit WM2 captures "1" output from the FF circuit WM1, latches, and outputs.

Since the output signal C of "1" is supplied from the AND circuit 62, the NAND circuit 63 switches the logical value of the mode switch signal mod2_1 from the logical value of "1" to the logical value of "0" when the output of the FF circuit WM2 becomes "1".

That is, the mode switch signal mod2_1 supplied to the selection terminal SL of the selector 37S maintains the logical value "1" even if the mode switch signal mod2 is switched to the logical value "0" at time t3, and then switches to the logical value "0" at time t3_R, which is a predetermined timing after time t3.

The selector 37S selects the PWM signal D_PWM by setting the mode switch signal mod2_1 to "0" at the time t3_R, and supplies the PWM signal D_PWM to the gate driver 15. Incidentally, since the output signal C of the AND circuit 62 is "1" and then the inverter circuit 64 supplies "0" to the AND circuit 65, the supply of the PFM signal A_PFM to the input terminal (1) of the selector 37S (1) is stopped.

In the mode switching circuit 37_1 according to the second embodiment, the predetermined logical value "1" is reached through the FF circuits FM1, FM2 of the two-stage series coupling whose clock signal is the PFM signal A_PFM, and then the operation of the FF circuit WM1, WM2 of the two-stage series coupling whose clock signal is the PWM signal D_PWM is allowed. The logical value of the mode switch signal mod2_1 is changed by reaching the predetermined logical value "1" via the two-stage series-coupled FF circuits WM1, WM2 in which the operation is allowed. Thus, when the transition from the analog PFM period to the digital PWM period is instructed by the mode switch signal mod2, the mode switching is performed delayed by the sum of the time corresponding to the number of stages of the FF circuits of the series coupling whose clock signal is the PFM signal A_PFM and the time corresponding to the number of stages of the FF circuits of the series coupling whose clock signal is the PWM signal D_PWM.

Further, the digital PWM control always start at the timing delayed by the time corresponding to the number of stages of the FF circuits of the series coupling whose clock signal is the PWM signal D_PWM, i.e., about 1.5 cycles of the PWM signal D_PWM in FIG. 7, from the timing at which the last transistor MP1 is turned off in the analog PFM period. As a result, it is possible to ensure the time the inductor current IL is lowered after the inductor current IL reaches the peak in the analog PFM period, to start the digital PWM control at a timing where the inductor current IL is in a state of being lowered, and to suppress a large overshoot of the output voltage Vout.

Figure 8:
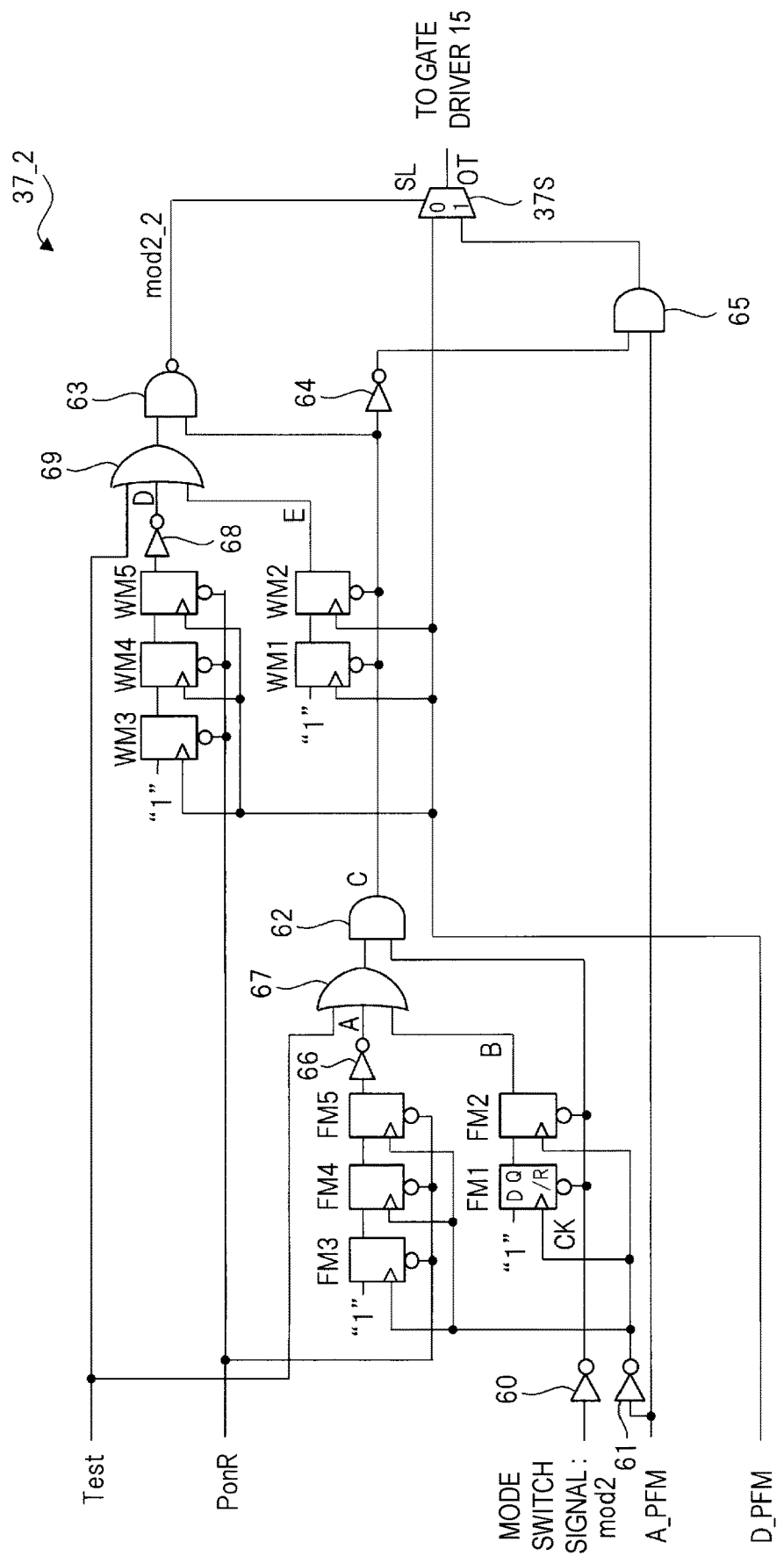
FIG. 8 is a block diagram showing the configuration of the mode switching circuit according to the third embodiment.

(Third embodiment) FIG. 8 is a block diagram showing the configuration of the mode switching circuit according to the third embodiment. The mode switching circuit 37_2 shown in FIG. 8 is used as a mode switching circuit 37 in the DC-DC converter 14 shown in FIG. 2. The mode switching circuit 37_2 will be described on the main difference since it is similar to the mode switching circuit 37_1 shown in FIG. 6. In the mode switching circuit 37_2, FF circuits FM3 to FM5, FF circuits WM3 to WM5, the inverter circuit 66, 68 and 3 input OR circuit 67, 69 are added with respect to the mode switching circuit 37_1. Further, in the mode switching circuit 372, a test signal Test and the reset signal PonR are supplied. The test signal Test is set to a logical value "1", for example, when testing the semiconductor device 10, and the reset signal PonR becomes a logical value "0" upon power-up as described above, and changes to a logical value "1" after the predetermined time has elapsed.

The FF circuits FM3 to FM5 are coupled by the output terminals Q and the input terminal D each other, constitutes a series coupling circuits of three stages. The input terminal D of the FF circuit FM3 corresponding to the first stage of the series coupling circuits is supplied the high level of the logical value "1", the output terminal Q of the FF circuit FM5 corresponding to the final stage is coupled to the inverter circuit 66. The FF circuits FM3 to FM5, similarly to the FF circuits FM1, FM2, operate with the PFM signal A_PFM as a clock signal. More specifically, the FF circuits FM3 to FM5, the respective clock terminals CK of which the PFM signal A_PFM inverted by the inverter circuit 61 is supplied to, operate in synchronization with the change of the PFM signal A_PFM. Further, unlike the FF circuits FM1, FM2, the FF circuits FM3 to FM5 are supplied the reset signal PonR to the respective reset terminals/R and are reset when the reset signal PonR is "0".

In the mode switching circuit 37_1 shown in FIG. 6, the output of the FF circuit FM2 was supplied to the AND circuit 62, but in the mode switching circuit 37_2, the output of the FF circuit FM2 is supplied as an output signal B to the 3 input OR circuit 67. in addition to the output signal B, an output signal A of the inverter circuit 66 and the test signal Test are supplied to the 3 input OR circuit 67, and the output of the 3 input OR circuit 67 is supplied to the AND circuit 62.

The coupling of the FF circuits WM3 to WM5, the inverter circuit 68 and the 3 input OR circuit 69 is similar to the coupling of the FF circuits FM3~FM5, the inverter circuit 66 and 3 input OR circuit 67 described above. The difference is that, the PWM signal D_PWM is supplied to the clock terminals CK of the FF circuits WM3 to WM5, similarly to the FF circuits WM1, WM2, and the FF circuits WM3 to WM5 operate in synchronization with the change of the PWM signal D_PWM. The 3 input OR circuit 69 is supplied a test signal Test, an output signal D of the inverter circuit 68, and an output signal E of the FF circuit WM2. The output signal C of the AND circuit 62 and the output of the 3 input OR circuit 69 are supplied to the NAND circuit 63, and the mode switch signal mod2_2 is output to control the selector 37S from the NAND circuit 63.

In the mode switching circuit 37_1 described in the second embodiment, after the mode switch signal mod2 becomes "0", the AND circuit 62 outputs an output signal C of the logical value "1" when the PFM signal A_PFM changes to "0" at only the times corresponding to the number of stages of the FF circuits coupled in series. After the output signal C is set to "1", when the PWM signal D_PWM changes to "1" at only the times corresponding to the number of stages of the FF circuits coupled in series, the NAND circuit 63 changes the mode switch signal mod2_1 to "0", and then instructs the switching to the PWM control.

In contrast, in the mode switching circuit 37_2, when the reset signal PonR is a logical value indicating a reset "0", each of the FF circuits FM3 to FM5 are reset, and the signal of the logical value "0" will be output from the FF circuits FM3 to FM5. The "0" output from the FF circuit FM5 is inverted by the inverter circuit 66, and then the output signal A becomes "1". Therefore, even without changing the PFM signal A_PFM, the 3-input OR circuit 67 sets the output signal to "1". At this time, if the mode switch signal mod2 is "0", the output signal C of the AND circuit 62 is a logical value "1". That is, even if the PFM signal A_PFM is not changed, the output signal C can be changed to "1" by the mode switch signal mod2 being set to "0" and the reset signal PonR set to "0".

The FF circuits WM3 to WM5, the inverter circuit 68 and 3 input OR circuit 69 operates in the same manner as the FF circuits FM3 to FM5, the inverter circuit 66 and 3 input OR circuit 67, and it is possible to change the output signal of the 3 input OR circuit 69 to "1" by the reset signal PonR set to "0" without changing the PWM signal D_PWM. Therefore, even if the PFM signal A_PFM and the PWM signal D_PWM do not change, the NAND circuit 63 outputs the mode switch signal mod2_2 including the logical value "0". That is, the PWM signal D_PWM is selected by the selector 37S.

Similarly, when the test signal Test is set to "1" in order to test the semiconductor device 10, even if the PFM signal A_PFM and the PWM signal D_PWM are not changed, the logical value of the mode switch signal mod2_2 is set to "0" so that the PWM signal D_PWM is selected by the selector 37S by setting the mode switch signal mod2_2 to the logical value "0".

The series coupling circuits comprising the FF circuits FM1, FM2 can be regarded as a counter for counting the number of cycles of the PFM signal A_PFM after the reset by the mode switch signal mod2 is released (hereinafter, referred to as the synchronization cycle number of the mode switch signal). Further, the series coupling circuits comprising the FF circuits FM3 to FM5 can be regarded as a counter for counting the number of cycles of the PFM signal A_PFM after the reset by the reset signal PonR is released (hereinafter, referred to as the synchronization cycle number of the reset signal).

The series coupling circuits comprising the FF circuits WM1, WM2 can be regarded as a counter for counting the number of cycles of the PWM signal D_PWM after the reset by the output signal C is released (also referred to as the synchronization cycle number of the mode switch signal). Further, the series coupling circuits comprising the FF circuits WM3 to WM5 can be regarded as a counter for counting the number of cycles of the PWM signal D_PWM after the reset by the reset signal PonR is released (also referred to as the synchronization cycle number of the reset signal).

In the configuration shown in FIG. 8, the synchronization cycle number of the mode switch signal is 2, the synchronization cycle number of the reset signal is 3.

When starting the digital-controlled DC-DC converter, it may be possible to transition to the digital PWM period without transitioning to the analog PFM period after the soft start control. That is, it may be possible to use a main power supply by digital PWM control as a power supply to the flash memory 17 and the processor 18 without using an auxiliary power supply by analog PFM control.

For example, the semiconductor device 10 may have a power saving mode that turns off the DC-DC converter 14. In order to save power, the DC-DC converter 14 may be turned off and then the DC-DC converter 14 may be restarted. In this case, since the system power supply area 13 is supplied by the second power supply voltage Vd2 as shown in FIG. 1, the control parameter 21 is stored in the register 39 shown in FIG. 2 in the system control logic 16 even if the DC-DC converter 14 is in the off state. Therefore, it is not necessary to read the control parameter 21 from the flash memory 17, and then it is possible to operate the circuit block disposed in the secondary power supply area 12 by the main power supply generated by the PWM control, after the soft start period by the soft start control circuit 44 starts and transitions to the digital PWM period without transitioning to the analog PFM period.

However, when using the mode switching circuit 37_1 described in the second embodiment as the mode switching circuit of the DC-DC converter 14, and initiating the DC-DC converter 14 with the mode switch signal mod2 to "0", it always transitions to the analog PFM period generating the auxiliary power supply after the soft start period.

In contrast, when using the mode switching circuit 37_2 shown in FIG. 8 as a mode switching circuit of the DC-DC converter 14, it is possible to transition to the digital PWM period after the soft start period is completed by restarting the DC-DC converter 14 with the reset signal PonR.

During the reset period in which the reset signal PonR is "0", the output signals A and D of the inverter circuits 66 and 68 become "1" as described above, although the synchronous control by the mode switch signal mod2 is disabled. Therefore, the output signal C becomes "1" by setting the mode switch signal mod2 to "0", and the mode switch signal mod2_2 becomes the logical value "0". As a result, the state of the PWM signal D_PWM selected is realized by the selector 37S. Thereafter, the reset is released when the reset signal PonR is 1, and then the PWM signal D_PWM and the PFM signal A_PFM are generated by the digital control loop 35 and the analog control loop 36.

The synchronization cycle number of the reset signal is 3, the synchronization cycle number of the mode switch signal is 2, as described above. Therefore, the output signal A changes the logical value from "1" to "0" in the third cycle of the PFM signal A_PFM, and the output signal B changes the logical value from "0" to "1" in the second cycle of the PFM signal A_PFM. The output signal D changes the logical value from "1" to "0" in the third cycle of the PWM signal D_PWM, and the output signal E changes the logical value from "0" to "1" in the second cycle of the PWM signal D_PWM.

When the mode switch signal mod2 is set to "0" in the reset state, the mode switch signal mod2_2 is immediately set to "0". From this state, the reset is released, when the PWM signal D_PWM and the PFM signal A_PFM is generated by the digital control loop 35 and the analog control loop 36, the output signal A is always "0" after the output signal B becomes "1" (synchronization disabled release). As a result, the state of the logical value "0" of the mode switch signal mod2_2 is maintained, and the selector 37S can continuously supply the PWM signal D_PWM as generated to the gate driver 15.

As a result, the DC-DC converter 14 using the mode switching circuit 37_2 can transition to the digital PWM period after the soft start period without transitioning to the analog PFM period.

When the semiconductor device 10 is tested, the control parameters 21 as required can be set in advance in the register 39. Therefore, the analog PFM period does not necessarily have to be interposed after the soft start period.

In the mode switching circuit 37_2 shown in FIG. 8, it is possible to set the output signals of the OR circuits 67 and 69 to the logical value "1", and to set the mode switch signal mod2_2 to the logical value "0" by setting the test signal Test to "1". That is, it is possible to switch the analog PFM control and the digital PWM control at any timing by disabling the synchronous control of the mode switch signal mod2. This allows testing both modes without complex sequence operations.

In FIG. 8, the FF circuits FM3 to FM5, the inverter circuit 66 and the OR circuit 67 can be regarded as constituting a fourth logic circuit. Further, the FF circuits WM3 to WM5, the inverter circuit 68 and the OR circuit 69 can be regarded as constituting the fifth logic circuit. The fourth logic circuit and the fifth logic circuit can be regarded as disabling the delay due to the FF circuits FM1, FM2, WM1, WM2, and the selector 37S as selecting the PWM signal D_PWM in response to the selection instruction of the PWM signal D_PWM by the mode switch signal mod2 at the time of testing and resetting.

Although the invention made by the present inventor has been specifically described based on the embodiment, the present invention is not limited to the embodiment described above, and it is needless to say that various modifications can be made without departing from the gist thereof.

What is claimed is:

1. A semiconductor device comprising:
   a converter that is characterized by a control parameter;
   a non-volatile storage device that operates with an output voltage of the converter; and
   a processor that operates using the output voltage of the converter and controls the non-volatile storage device,
   wherein the control parameter is stored in the non-volatile storage device,
   wherein the control parameter is read from the non-volatile storage device by the processor and is set in the converter while the converter generates the output voltage,
   wherein the converter comprises:
      a digital control loop that is characterized by the control parameter;
      an analog control loop that includes a predetermined characteristic;
      a first mode switching circuit that is coupled to the digital control loop and the analog control loop, and is configured to select between the digital control loop and the analog control loop by a first mode switch signal,
   wherein the output voltage of the converter is determined by the digital control loop or the analog control loop selected by the first mode switching circuit,
   wherein the converter further comprises a register that is coupled to the digital control loop,
   wherein the control parameter is set to the register of the converter while the analog control loop is selected by the first mode switching circuit,
   wherein the digital control loop comprises:
      a compensation circuit that is characterized by the control parameter from the register, and is supplied a digital signal corresponding to an error between the output voltage of the converter and a reference voltage; and
      a first comparator that compares a comparison signal that changes over time, and outputs a PWM signal,
   wherein the analog control loop comprises a second comparator that compares an analog signal corresponding to the error and a predetermined threshold, and outputs a PFM signal, and
   wherein the PWM signal and the PFM signal are selected by the first mode switching circuit.

2. The semiconductor device according to claim 1,
   wherein the converter further comprises:
   a soft start control circuit that outputs a predetermined signal before the compensation circuit operates; and
   a second mode switching circuit that selects between an output of the compensation circuit and an output of the soft start control circuit by a second mode switch signal, and
   wherein the first comparator compares a signal selected by the second mode switching circuit and the comparison signal, and outputs the PWM signal.

3. The semiconductor device according to claim 1,
   wherein the first mode switching circuit comprises:
   a plurality of first flip-flop circuits that are coupled in series, the PFM signal being supplied to a clock terminal of each of the plurality of first flip-flop circuits;
   a first logic circuit to which a first signal via the plurality of first flip-flop circuits and the first mode switch signal are supplied;
   a plurality of second flip-flop circuits that are coupled in series, the PWM signal being supplied to a clock terminal of each of the plurality of second flip-flop circuits;
   a second logic circuit to which a second signal via the plurality of second flip-flop circuits and an output of the first logic circuit are supplied; and
   a selector that selects the PWM signal or the PFM signal according to an output of the second logic circuit, and
   wherein, when the first mode switch signal instructs to select the PWM signal, the selector selects the PWM signal after a time delay corresponding to a number of stages of the first flip-flop circuits and the second flip-flop circuits coupled in series.

4. The semiconductor device according to claim 3,
   wherein the plurality of first flip-flop circuits are reset based on the first mode switch signal,
   wherein the plurality of second flip-flop circuits are reset based on an output of the first logic circuit, and
   wherein the selector is supplied an output of a third logic circuit provided with the output of the first logic circuit, the PFM signal, and the PWM signal.

5. The semiconductor device according to claim 3,
   wherein the first mode switching circuit further comprises:

a fourth logic circuit to which the first signal, a signal based on a reset signal, a signal based on the PFM signal, and a test signal are supplied; and a fifth logic circuit to which the second signal, a signal based on the reset signal, the PWM signal, and the test signal are supplied, wherein the first logic circuit is supplied the first mode switch signal and an output of the fourth logic circuit, and wherein the second logic circuit is supplied the output of the first logic circuit and an output of the fifth logic circuit, and wherein, during test time specified by the test signal and reset time specified by the reset signal, the time delay corresponding to the number of stages of the first flip-flop circuits and the second flip-flop circuits coupled in series is disabled, and the selector selects the PWM signal in response to the first mode switch signal that instructs to select the PWM signal.

6. A system comprising:

a semiconductor device:

a first external terminal and a second external terminal;

a switching circuit that is coupled with the first external terminal;

a processor;

a non-volatile storage device, the processor and the non-volatile storage device being coupled to the second external terminal, and operating with a voltage at the second external terminal; and a converter that is coupled to the first external terminal, and is characterized by a control parameter, wherein the switching circuit comprises:

a transistor that switches according to an output of the converter provided via the first external terminal; and an inductor and a capacitor that are supplied current via the transistor, and wherein the switching circuit outputs a voltage corresponding to the output of the converter to the second external terminal, wherein the control parameter is stored in the non-volatile storage device, and is read from the non-volatile storage device, and is set to the converter by the processor, wherein the converter comprises:

a digital control loop comprising:

a compensation circuit that is characterized by the control parameter, and is supplied a digital signal corresponding to an error between an output voltage at the second external terminal and a reference voltage; and a first comparator that compares an output of the compensation circuit and a comparison signal that changes over time, and outputs a PWM signal;

an analog control loop comprising a second comparator that compares an analog signal corresponding to the error and a predetermined threshold, and outputs a PFM signal; and a mode switching circuit that is coupled to the digital control loop and the analog control loop, and is configured to select between the PWM signal and the PFM signal by a mode switch signal, and to output as an output of the converter.

7. The system according to claim 6, wherein the converter further comprises a register that the control parameter is set while the PFM signal is output as the output of the converter.

8. A control method for generating a power supply voltage to operate a semiconductor device including a non-volatile storage device that stores a control parameter and a converter, the control method comprising:

supplying, to a compensation circuit of a digital control loop of the converter that is characterized by the control parameter, a digital signal corresponding to an error between the power supply voltage and a reference voltage;

comparing, by a first comparator of the digital control loop of the converter, an output of the compensation circuit and a comparison signal that changes over time to generate a PWM signal;

comparing, by a second comparator of an analog control loop of the converter, an analog signal corresponding to the error and a predetermined threshold to generate a PFM signal; and selecting, by a mode switching circuit that is coupled to the digital control loop and the analog control loop, between the PWM signal and the PFM signal by a mode switch signal to output as an output of the converter, wherein, when a voltage value of the power supply voltage generated based on the output of the converter reaches a predetermined value, i) the PFM signal is selected by the mode switch signal and ii) the power supply voltage is generated based on the selected PFM signal, wherein the control method further comprises transferring the control parameter stored in the non-volatile storage device to the compensation circuit, while the power supply voltage is generated based on the PFM signal, and wherein, after the control parameter is transferred to the compensation circuit, i) the PWM signal is selected by the mode switching circuit and ii) the power supply voltage is generated based on the PWM signal.

9. The control method according to claim 8, further comprising outputting, by a soft start control circuit of the converter, a predetermined signal before the compensation circuit operates, wherein the voltage value of the power supply voltage rises to the predetermined value based on the predetermined signal from the soft start control circuit.

10. The control method according to claim 9, further comprising starting, by soft start control circuit of the converter, operation in response to power-on.

* * * * *